United States Patent [19]

Rice et al.

[11] Patent Number: 4,599,676

[45] Date of Patent: Jul. 8, 1986

[54] CAPACITOR WITH INTEGRAL DISCHARGE RESISTOR AND METHOD OF MAKING SAME

[75] Inventors: Ronald B. Rice, Monroe, Conn.; Theodore P. Kosnosky, Greer, S.C.

[73] Assignee: Universal Manufacturing Corporation, Paramus, N.J.

[21] Appl. No.: 701,145

[22] Filed: Feb. 13, 1985

[51] Int. Cl.4 .......................... H01G 1/11; H01G 4/38
[52] U.S. Cl. ..................... 361/275; 29/25.42
[58] Field of Search .................. 361/15, 275; 323/370; 338/302; 29/25.42

[56] References Cited

U.S. PATENT DOCUMENTS

| | | | |
|---|---|---|---|
| 1,324,792 | 12/1919 | Booth | 323/370 |
| 1,632,089 | 6/1927 | Marbury | 338/302 X |
| 2,348,462 | 5/1944 | Framburg et al. | 338/302 X |
| 2,753,616 | 7/1956 | Tognola | 29/25.42 |
| 2,858,492 | 10/1958 | Lamphier | 29/25.42 X |
| 3,219,915 | 11/1965 | Person | 323/370 |
| 3,353,124 | 11/1967 | Dilger | 29/25.42 X |
| 3,892,023 | 7/1975 | Warmont | 29/25.42 |
| 3,921,041 | 11/1975 | Stockman | 29/25.42 X |
| 4,443,829 | 4/1984 | Delvy et al. | 361/275 |

*Primary Examiner*—Donald A. Griffin
*Attorney, Agent, or Firm*—Darby & Darby

[57] ABSTRACT

A capacitor with an integral discharge resistor includes a central core formed at least partially from an electrically resistive material and which includes opposite axial ends. First and second sheets of electrically conductive material, as well as a sheet of electrically insulating material interposed between the first and second sheets of conductive material, are wound about the resistive core to form convoluted layers coaxial with the resistive core. The sheets include opposite transverse edges. The resistive core and the convoluted layers of conductive and insulating sheets provide the capacitor with an overall shape of a cylinder having axial end portions defined by the edges of the sheets and the opposite ends of the resistive core. A conductive coating is applied to the axial end portions of the cylindrical shape of the capacitor.

5 Claims, 6 Drawing Figures

CAPACITOR WITH INTEGRAL DISCHARGE RESISTOR AND METHOD OF MAKING SAME

BACKGROUND OF THE INVENTION

1. Field of the Invention

The invention relates to capacitors, and more specifically relates to capacitors of the wound metalized dielectric type.

2. Description of the Prior Art

A wound metalized dielectric capacitor with an integrally formed discharge resistor is disclosed in U.S. Pat. No. 4,443,829, issued on Apr. 17, 1984 to Delvy, et al. The U.S. Pat. No. 4,443,829 discloses the formation of a section of resistive material on a film forming the metalized dielectric. The resistive material extends across the film's entire width. A metal contact for one of the capacitor plates is sprayed on either end of the capacitor so as to touch one end of the section of resistive material, thereby creating a resistive shunt across the plates formed on the metalized film.

The capacitor and manufacturing process of that patent eliminated the labor-intensive manual operations involved in providing an external discharge resistor on the capacitor. Substantial economies were thereby achieved. However, the patent required the separate manufacture of a metallized film with resistive material formed thereon, which involved a labor-intensive step not encountered in the conventional capacitor manufacturing process. Also, care was required in handling the film and winding it over the capacitor core to avoid dislodging or otherwise damaging the resistive material.

Broadly, it is an object of the present invention to produce a capacitor having an integral discharge resistor and to provide a method for manufacturing the same which avoid the shortcomings of the prior art. It is specifically intended that labor intensive manufacturing procedures for incorporating the resistor in the capacitor unit be eliminated.

It is another object of the present invention to provide an integral discharge resistor in a capacitor of the wound metalized dielectric type.

It is a further object to provide an effective method for manufacturing a capacitor of the wound metalized dielectric type in such a manner as to provide an integral discharge resistor.

It is also an object of the present invention to provide a capacitor of the type described which is relatively simple and inexpensive in construction, yet reliable and convenient in use and easy to manufacture.

These objects, among others which will be discussed hereinafter, are achieved in a preferred form of the invention by providing a capacitor of the type employing a wound metalized dielectric (preferably a metalized film) with a core which is formed at least in part from a resistive material which extends across the entire width of the film (the axial dimension of the capacitor). A metal contact for one of the capacitor plates (formed by the metalization) is sprayed on either end of the capacitor so as to touch one end of resistive core, thereby creating a resistive shunt across the plates formed on the metalized film. As a result, a capacitor with an integral resistor can be manufactured without any additional steps compared to the conventional process.

BRIEF DESCRIPTION OF THE DRAWING

The foregoing brief description and further objects, features and advantages of the present invention will be more completely understood from the following detailed description of presently preferred, but nonetheless illustrative, embodiments of the invention with reference being had to the drawing, in which.

DETAILED DESCRIPTION OF PREFERRED EMBODIMENTS

Figure 1:
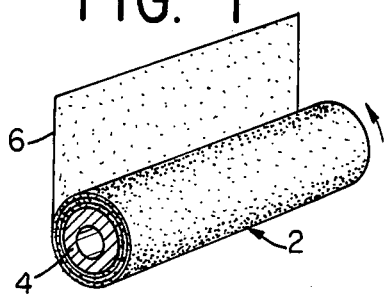
FIG. 1 schematically illustrates a preferred method for forming a resistive core of one embodiment of the present invention.
Figure 2:
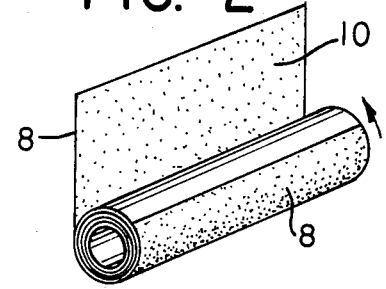
FIG. 2 illustrates an alternative method for forming the resistive core of the present invention.

The first step in the manufacture of a preferred embodiment of the present invention is the formation of a resistive core, as illustrated by FIG. 1. In accordance with one embodiment of the invention, the central resistive core 2 of the capacitor includes a hollow, inner cylindrical support core 4, and an elongated sheet 6 of resistive material that is wound about the support core 4 in the form of one or a number of convoluted layers. The cylindrical support core 4 is formed from an electrically insulating material, such as plastic. Alternatively, the support core 4 may be formed by wrapping about itself a sheet of cardboard or paper to form several layers. The elongated sheet of resistive material 6 may be separate from the paper forming the support core, or as illustrated by FIG. 2, may be a portion 8 of the paper sheet 10 forming the support core 4, that portion 8 being impregnated with a resistive material.

Figure 3:
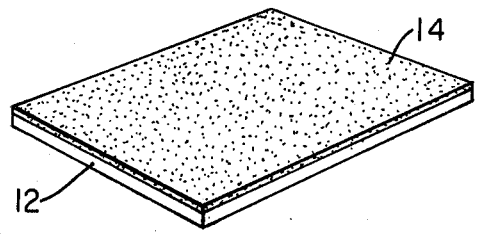
FIG. 3 illustrates the structure of a material which may be used in forming the resistive core.

Carbon loaded paper may be suitably used as the elongated sheet of resistive material 6. Also suitable for use as the resistive material is a sheet with a support backing 12 on which a conductive ink film 14 is deposited, as illlustrated by FIG. 3.

The central resistive core 2 may be formed without an inner support core 4. The elongated sheet of resistive material 6 may be wrapped around itself a sufficient number of times to provide the support necessary for wrapping the other layers of the capacitor which act as the plates and dielectric. The elongated sheet of resistive material 6 may be helically wound about itself or spirally wound.

In forming the capacitor of the present invention, it should be remembered that the resistance of the central resistive core 2 will vary in accordance with such parameters as the combined radial thickness of the convoluted layers of resistive material, the axial length and circumference of the resistive material, and the type of resistive material used in forming the core. If carbon loaded paper is used as the resistive material, the density of the carbon loading will also determine the resistance of the core.

All of these parameters can be controlled during the manufacturing process to provide the capacitor with the correct shunt resistance.

Figure 4:
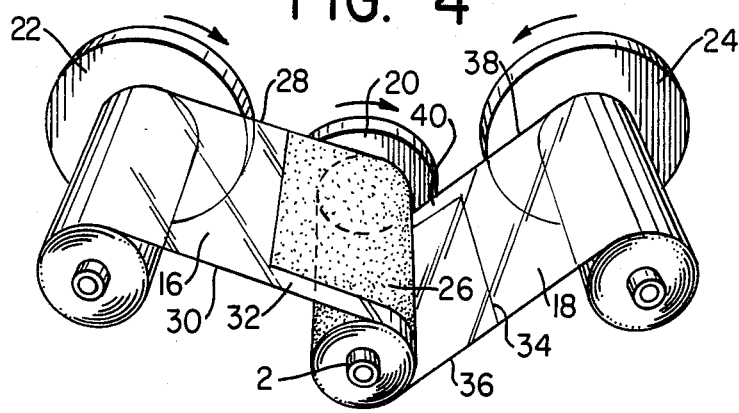
FIG. 4 schematically illustrates the assembly process for forming the capacitor, in accordance with the present invention.
Figure 5:
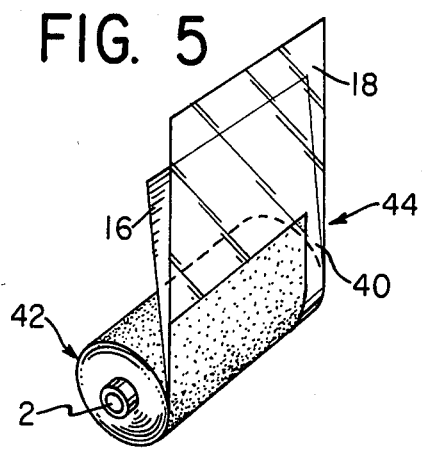
FIG. 5 shows the capacitor of the present invention prior to completion of wrapping.
Figure 6:
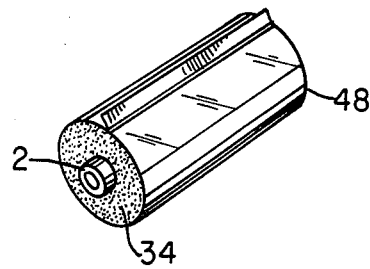
FIG. 6 illustrates the capacitor of the present invention after wrapping and metal spraying at the ends.

FIGS. 4, 5 and 6 illustrate a method for forming a preferred form of the capacitor of the present invention, after the resistive core 2 has been formed. The capacitor of the present invention is formed in a manner similar to that used for forming a conventional wound, metalized dielectric capacitor, except that the central core is formed from a resistive material and acts as the support about which the other layers of the capacitor are wrapped.

First and second sheets or strips 16, 18 of a metalized insulating film are wound, in convoluted layers, upon the central resistive cylindrical core 2, which is rotated by a winding bobbin 20. Core 2 should preferably be longer than the width of strips 16, 18 and should protrude laterally beyond each strip. The strips 16, 18 are drawn off respective supply wheels 22, 24. Strip 16 is metalized with a conductor forming one plate of the capacitor at its region 26. Region 26 extends all the way to edge 28, but is inset from and parallel to edge 30. The region 32 located between region 26 and edge 30 of strip 16 is known as a "margin".

Strip 18 is likewise metalized, forming a second plate of the capacitor, at its region 34, which extends all the way to edge 36 but is parallel to and inset from edge 38. There is, thus, a margin 40 between region 34 and edge 38. As shown, margin 40 and margin 32 are opposite lateral edges of the strips 16, 18 and will be disposed at opposite ends of the finished capacitor. Furthermore, region 34 is located on that surface of strip 18 which does not touch strip 16 so that metalized regions 26 and 34 are insulated from each other by strip 18.

The outermost ends of strips 16 and 18 are completely unmetalized. The capacitor is finished by wrapping the ends of strips 16 and 18 perhaps five turns around the completed unit and securing the ends, preferably by adhesive or heat-sealing. This forms a cylindrical capacitor with axial ends 42 and 44.

After wrapping, the ends 42 and 44 are sprayed or otherwise coated with molten metal, which adheres to the metalization on strips 16 and 18. That is, metal layers 46 and 48 adhere to the metalization in region 34 and 26, respectively. The capacitor plates (metalization layers) are not short-circuited together at either end 42 or 44, because margins 32 and 40 prevent one layer of metal touching both plates of the capacitor at the same time.

The axial ends 50, 52 of the resistive core 2 should extend beyond the conductive material forming the plates of the capacitor so that the edges of the conductive sheets, in their wound state, and the axial ends 50, 52 of the resistive core 2 define the axial ends 30 and 32 of the capacitor. This ensures that the capacitor plates and the ends 50, 52 of the resistive core are electrically joined by coating or spraying the ends 30 and 32 with molten metal.

Layer 46 serves as a terminal to which a lead can be soldered to establish an electrical connection with the plate formed by the metalized region 34, and layer 48 similarly permits a connection with the metalized region 26.

The formation of a resistive core about which the other layers of the capacitor are wrapped advantageously simplifies the manufacturing process and provides a highly reliable capacitor with a mechanically simplified structure.

The capacitor and method of making the capacitor, in accordance with the present invention, further eliminates the need to wrap individual resistive bars between the layers of the capacitor, or a separate protective wrapping that includes a resistive bar, as disclosed in U.S. Pat. No. 4,443,829.

Although preferred forms of the invention have been disclosed for illustrative purposes, those skilled in the art will appreciate that many additions, modifications and substitutions are possible without departing from the scope and spirit of the invention as defined in the accompanying claims. For example, the capacitor may be formed from a first sheet of non-conductive material having a metalized conductive region formed on each of the flat surfaces of the sheet, the metalized conductive regions defining the plates of the capacitor. Each region extends from one lateral edge of the sheet, but is inset from the other edge to form a non-conductive margin. The margins are located on opposite surfaces of the sheet and at opposite lateral edges. A second sheet formed of an insulating material is positioned adjacent one of the flat surfaces of the first sheet. Together the sheets are wrapped about a resistive core to form a capacitor, with the axial ends of the capacitor being sprayed with metal to shunt the resistive core across the capacitor plates.

What is claimed is:

1. A capacitor with an integral discharge resistor, which comprises:

a central core formed at least partially of an electrically resistive material, the central core including an inner support core section and an outer resistive core section, the inner and outer core sections being formed from an elongated sheet of paper material which is rolled about itself, the elongated sheet of paper material including a first portion impregnated with a resistive material, and a second portion of paper material, the elongated sheet being rolled so that the second portion of paper material defines the inner support core section and the first portion impregnated with the resistive material defines the outer resistive core section;

a sheet of electrically insulating material having first and second outer edges;

first and second sheets of electrically conductive material in spaced, opposed relationship, the electrically insulating sheet being disposed therebetween, the first conductive sheet extending outwardly at least up to said second edge, there being provided a first non-conductive margin along the first edge at which the first electrically conductive sheet cannot be contacted, the second conductive sheet extending outwardly at least to the first edge, there being provided a second non-conductive margin along the second edge at which electrical contact cannot be made with the second conductive sheet, the first and second sheets of electrically conductive material and the sheet of electrically insulating material being in the form of elongated strips and being wound into consecutive convoluted layers about the central core to form a capacitor, the width of the sheet of electrically insulating material being defined by the first and second edges thereof, the central core extending at least to the first and second edges of the insulating sheet;

first connecting means disposed at the second edge for providing an electrical connection between the first conductive sheet and one end of the central core; and second connecting means disposed at the first edge for providing an electrical connection between the second conductive sheet and the other end of the central core.

2. A capacitor as defined by claim 1, wherein the elongated sheet of resistive material is a carbon loaded paper.

3. A capacitor as defined by claim 1, wherein the elongated sheet of paper material is helically wound about itself.

4. A capacitor as defined by claim 1, wherein the elongated sheet of paper material is spirally wound about itself.

5. A method of forming a capacitor having an integral discharge resistor, which comprises the steps of:

winding an elongated sheet formed at least partially of an electrically resistive material about itself to form a central resistive core, the central resistive core including an inner support core section and an outer resistive core section, the elongated sheet including a first portion formed of paper impregnated with a resistive material and a second portion formed of paper, the elongated sheet being rolled so that the second portion of paper defines the inner support core section and the first portion impregnated with resistive material defines the outer resistive core section;

winding first and second sheets of electrically conductive material and a sheet of electrically insulating material interposed between the first and second sheets of conductive material about the central resistive core, the width of the elongated sheet forming the central core extending at least across the width of said sheet of insulating material, said sheets forming convoluted layers coaxial with the central resistive core, the sheets including opposite transverse edges, the central resistive core and the convoluted layers of conductive and insulating sheets having axial end portions defined by the edges of the sheets and the opposite ends to the central resistive core; and applying a conductive coating to the axial end portions of the cylindrical shape of the capacitor.

* * * * *